Mar. 3, 1925.

A. TOLMAN

VEHICLE HEADLIGHT

Filed March 24, 1924

1,528,279

Inventor
Arthur Tolman
By
B. Singer, Atty.

Patented Mar. 3, 1925.

1,528,279

UNITED STATES PATENT OFFICE.

ARTHUR TOLMAN, OF BRIGHTON, ENGLAND.

VEHICLE HEADLIGHT.

Application filed March 24, 1924. Serial No. 701,344.

*To all whom it may concern:*

Be it known that I, ARTHUR TOLMAN, a subject of the King of Great Britain, residing at Brighton, Sussex, England, have invented new and useful Improvements in and Connected with Vehicle Headlights, of which the following is a specification.

This invention relates to vehicle headlights of the dipping or tilting type provided with horizontal plates disposed within the body of the headlight and adapted to obscure the source of light at the normal angle of vision when the lamp is dipped or tilted.

The maximum angle of tilt of a dipping or tilting headlight is to a certain extent arbitrarily fixed by considerations of safety, inasmuch as each degree of tilt narrows the area illustrated from a maximum when the beam of light is horizontal to a minimum when the beam is cast upon the ground immediately in the front of the vehicle by the excessive dipping or tilting of the headlight.

In headlights of the type to which this invention refers it has been proposed to use plates of narrow width, for example one inch, so that in order to wholly obscure the source of light when viewed at the normal angle of vision, it is necessary for the same to be widely spaced to tilt the headlight in a downward direction through a comparatively wide angle of as much as 45°. To decrease the angle of tilt with the use of these narrow plates it was found necessary however to place such plates close together, for example 0.05 inch apart. This however has the effect of seriously reducing the illuminating power of the projected light beam.

The object of the present invention is to provide a headlight of the type specified by means of which the light source is totally obscured when viewed at the normal angle of vision with a relatively small angle of tilt on the headlight for example about 10°, and with the use of comparatively widely spaced plates or shelves the dimming effect of which on the illuminating power of the projected light beam is practically nil.

With this object in view the present invention consists broadly of a dipping or tilting headlight having a plurality of comparatively widely spaced plates in the form of superimposed shelves of substantial depth disposed within the body of the headlight in front of the reflector and behind the front glass.

As the depth of these plates or shelves cannot be too great it will be found convenient in practice to make the same of such a depth that they extend from the forward edge of the reflector to as close as possible to the inside face of the usual front glass.

I wish it to be understood that no claim is made to the use of shelves as above defined "per se" but only when used or intended to be used in combination with headlights of the dipping or tilting type.

In order that the invention may be clearly understood an embodiment of the same will now be described by aid of the accompanying drawings in which:—

Figure 1:
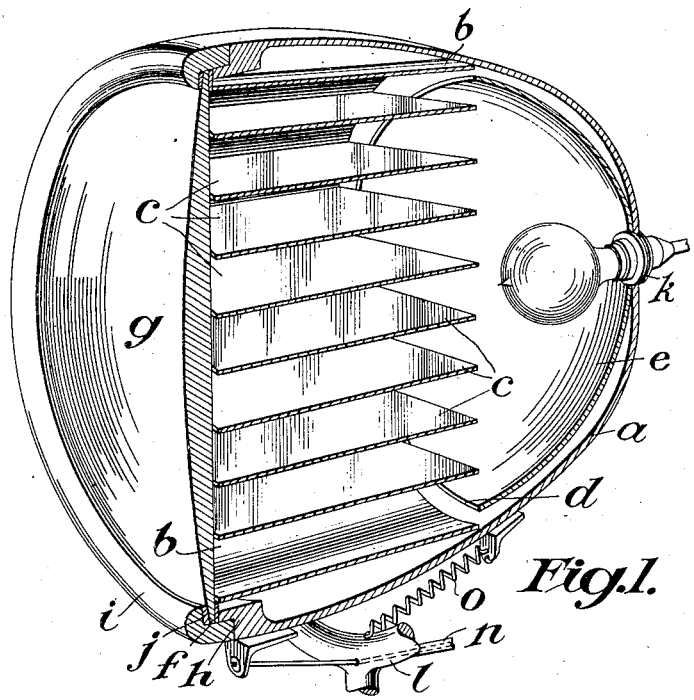
Figure 1 is a perspective sectional view of a motor headlight according to this invention.
Figure 2:
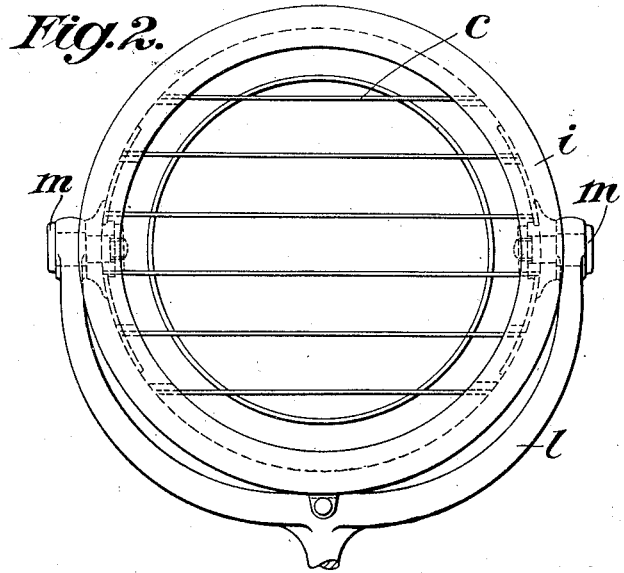
Figure 2 is a front elevation of the same showing the trunnion supports permitting the body of the headlight to be tilted.

The headlight illustrated in the drawings comprises a metal body $a$ which is slightly deeper than conventional form to accommodate the obscuring device. This device in the form illustrated consists of a metal cylinder $b$ containing a plurality of thin metal or other shelves $c$ arranged horizontally one above the other at a substantial distance apart, which shelves may have reflective undersurfaces or be dead black on both sides. These shelves are, in the example shown, of the same depth from front to back as the cylinder $b$ containing them and such cylinder in turn is of such a depth and diameter as to permit the same to be located within the body $a$ with its rear edge abutting against the front edge $d$ of the reflector $e$ and its front edge which is preferably flanged as at $f$, abutting against the inside face of the front glass $g$. The cylinder $b$ is held in place by reason of its flange $f$ being nipped between the front thickened edge $h$ of the body $a$ and the front glass $g$. The glass $g$ in turn is held in position by a screwed or other ring $i$ and an interposed resilient washer $j$.

The reflector $e$ may be held in position by being nipped between the two halves of the lamp socket $k$, as shown.

The body $a$ is mounted between the furcations of a forked bracket $l$ by which it is supported through the medium of trunnions $m$ which permit the body $a$ to be tilted about their axes. This tilting movement may be effected from the driver's seat through the medium of a "Bowden" wire connection $n$ or other suitable means. A spring $o$ is provided to return the body $a$ to its normal position when the tilting means are released.

In consequence of the comparatively great depth of the plates $c$ a very small angle of tilt imparted to the body $a$ is sufficient to cause the light source to be totally obscured at the normal angle of vision this preventing dazzling without unduly reducing the area of ground illuminated.

Having now particularly described and ascertained the nature of my said invention, and in what manner the same is to be performed, I declare that what I claim is:—

A headlight comprising a casing, a support for said casing comprising a pair of pivots about which the casing can turn as a whole in a vertical plane, a reflector in said casing, a lens at the front of the casing, a cylinder arranged in the casing between the lens and the reflector, widely spaced horizontal plates in the cylinder, said plates extending the full depth from the lens to the reflector, and means for moving the casing about its pivots so as to tilt the headlight as a whole.

In testimony whereof I have signed my name to this specification.

ARTHUR TOLMAN.